United States Patent [19]
Beal et al.

[11] Patent Number: 5,434,832
[45] Date of Patent: Jul. 18, 1995

[54] AUTOMATED CASSETTE LIBRARY APPARATUS FOR TRANSPORTING A CASSETTE ALONG THREE PERPENDICULAR AXES

[75] Inventors: Thomas R. Beal; Dennis W. Chalmers, both of Dover, N.H.; Eric C. W. Lin, Westwood, Mass.

[73] Assignee: GTE Vantage Incorporated, Stamford, Conn.

[21] Appl. No.: 981,534

[22] Filed: Nov. 25, 1992

[51] Int. Cl.$^6$ .............................................. G11B 17/22
[52] U.S. Cl. ........................................ 369/36; 369/34; 360/92
[58] Field of Search .................. 358/102, 86; 369/34, 369/36, 192; 360/92; 414/667

[56] References Cited

U.S. PATENT DOCUMENTS

| | | | |
|---|---|---|---|
| 3,536,194 | 10/1970 | Novak | 209/80.5 |
| 3,750,804 | 8/1973 | Lemelson | 214/16.4 |
| 4,563,120 | 1/1986 | Josserand | 414/273 |
| 4,593,332 | 6/1986 | Loomer | 414/663 |
| 4,614,474 | 9/1986 | Sudo | 360/36 |
| 4,668,150 | 5/1987 | Blumberg | 414/273 |
| 4,731,682 | 3/1988 | Nishiyama et al. | 360/92 |
| 4,734,005 | 3/1988 | Blumberg | 414/273 |
| 4,754,397 | 6/1988 | Varaiya et al. | 369/34 |
| 4,772,968 | 9/1988 | Nonaka et al. | 360/92 |
| 4,802,035 | 1/1989 | Ohtsuka | 360/92 |
| 4,867,286 | 9/1989 | Ammon et al. | 414/273 |
| 4,872,463 | 4/1989 | Motoyoshi et al. | 369/36 |
| 4,885,579 | 12/1989 | Sandbank | 340/825.72 |
| 4,885,803 | 12/1989 | Hermann et al. | 455/603 |
| 4,910,619 | 3/1990 | Suzuki et al. | 369/34 |
| 4,920,432 | 4/1990 | Eggers et al. | 360/33.1 |
| 4,937,690 | 6/1990 | Yamashita et al. | 360/92 |
| 4,945,429 | 7/1990 | Munro et al. | 360/92 |
| 4,947,244 | 8/1990 | Fenwick et al. | 358/86 |
| 4,989,191 | 1/1991 | Kuo | 369/36 |
| 5,050,020 | 9/1991 | Campbell et al. | 360/92 |
| 5,059,772 | 10/1991 | Younglove | 235/383 |
| 5,123,000 | 6/1992 | Fitzgerald et al. | 360/92 |
| 5,130,793 | 7/1992 | Bordry et al. | 358/86 |
| 5,132,789 | 7/1992 | Ammon et al. | 358/86 |
| 5,164,928 | 11/1992 | Oliver et al. | 369/34 |
| 5,182,687 | 1/1993 | Campbell et al. | 360/92 |
| 5,225,691 | 7/1993 | Powers et al. | 250/561 |
| 5,225,948 | 7/1993 | Yamashita et al. | 360/92 |
| 5,235,474 | 8/1993 | Searle | 360/92 |
| 5,285,335 | 2/1994 | Sato | 360/92 |

FOREIGN PATENT DOCUMENTS

| | | | |
|---|---|---|---|
| 54-137305 | 10/1979 | Japan | 360/92 |
| 60-76051 | 4/1985 | Japan | 369/34 |
| 61-187162 | 8/1986 | Japan | . |
| 62-134852 | 6/1987 | Japan | 360/92 |
| 62-236170 | 10/1987 | Japan | . |
| 1-86355 | 3/1989 | Japan | . |
| 3-63959 | 3/1991 | Japan | 360/92 |

*Primary Examiner*—John H. Wolff
*Assistant Examiner*—Kevin M. Watkins
*Attorney, Agent, or Firm*—Young & Thompson

[57] ABSTRACT

An automated video cassette library apparatus is provided which is actuated in response to command signals originated by an individual at a location remote from such apparatus to transfer a select video cassette in a horizontal plane from a cassette shelf to a cassette player each of which is located in a compact housing. The apparatus is then ready for use by another individual who may select another video cassette for playing upon another video player each of which is located in the same housing. The cassette player plays the video cassette and communicates the recorded program to the individual's television set. Upon completion of each play, the video cassette is rewound and automatically transferred from the cassette player to the cassette shelf.

13 Claims, 9 Drawing Sheets

AUTOMATED CASSETTE LIBRARY APPARATUS FOR TRANSPORTING A CASSETTE ALONG THREE PERPENDICULAR AXES

RELATED APPLICATION

U.S. Ser. No. 07/981,533, entitled "Apparatus For Controlling An Automated Cassette Library" naming Dennis W. Chalmers, Ole F. Kristensen and Eric C. W. Lin as applicants and GTE Vantage Incorporated as assignee and U.S. Ser. No. 07/981,518, entitled "Automated Cassette Library System" naming Dennis W. Chalmers, Leonard M. Kendall, Ole F. Kristensen, Eric C. W. Lin and Howard S. K. Wan as applicants and GTE Vantage Incorporated as assignee, each filed simultaneously with this application, pertain to different features of the automated cassette library apparatus described herein, and are hereby incorporated by reference. In particular, such applications pertain to various electronic control and system features of the automated cassette library apparatus described herein.

BACKGROUND OF THE INVENTION

It is presently known to provide paid television entertainment stored upon video cassette tapes to television sets located in guest rooms in hotels and motels. In prior art systems it has been possible for a guest to originate a recorded program from various sources such as a hotel or motel using a microwave link to a hotel or motel or a video tape player located directly in the hotel or motel. The present invention is directed to an automated cassette library apparatus located at the source. Such a cassette library contains a plurality of video cassettes having varying titles from which an individual can select as desired from his hotel or motel room. Upon selection the apparatus automatically retrieves the selected cassette and inserts it into a video cassette player. The program is then communicated to the guest's television set in the guest's room. The manner of ordering a recorded program and relaying such program to the desired television does not form part of the present invention and is therefore not described in any greater detail herein. The present invention is directed to the apparatus which responds to command signals originating at a remote location such as a guest's hotel or motel room and physically transfers the selected video cassette from a plurality of video cassettes which constitute the video cassette library to a select video cassette player. Such transfer includes the use of a cassette transport unit having a cassette carrying cavity therein and including means for transferring a cassette in a first direction, relative to the cassette carrying cavity, to and from a cassette shelf, and in a second direction, relative to the cassette carrying cavity, to and from a cassette player, the second direction being perpendicular to the first direction, and for transporting the cassette transport unit vertically and horizontally relative to cassette storage shelves and cassette players.

It is known to provide apparatus useful in storing and retrieving objects upon demand using apparatus which travels in X, Y and Z directions. Examples of such apparatus are described in U.S. Pat. Nos. 3,536,194, 3,750,804 and 4,595,332.

The apparatus described in U.S. Pat. No. 3,536,194 relates to a document retrieval and handling system wherein each of a plurality of storage compartments includes a cartridge, holding up to 100 randomly arranged cards, and a cartridge transporting device. The transporting device includes a complicated cable arrangement for driving the device in X, Y and Z directions.

U.S. Pat. No. 3,750,804 relates to a complex and bulky warehousing system including a storage rack and a stacker crane movable relative to the rack for depositing and removing loads therefrom.

U.S. Pat. No. 4,595,332 relates to a stacker-retriever lift carriage which includes a telescoping shuttle including a shuttle base, middle table and top table disposed one atop the other and for bi-directional movement relative to each other. Such shuttle allows for movement of the top table at twice the relative distance of the middle table and in a corresponding direction thereto.

In all of the foregoing patents, automatic movement of the object being transferred relative to the transferring unit which retains the object during movement thereof from one location to another, is in a single axial direction. In other words, the transferring unit retrieves the object along a particular axis and delivers the object along the same axis.

It is also known to provide apparatus useful in storing and retrieving video cassettes upon demand using apparatus which may travel in X, Y and Z directions. Examples of such apparatus are described in U.S. Pat. Nos. 4,563,120, 4,734,005 and 4,867,628. However, in each of the foregoing patents the automatic movement of the video cassette relative to the transferring unit which retains the video cassette during movement thereof for dispensing or storing is in a single axial direction, the video cassette generally travelling in the same axial direction relative to the transferring unit from the beginning to the end of the retrieval or storage cycles. For example, in U.S. Pat. No. 4,734,005, a video cassette is moved into and out of a transport unit relative to a storage bin and relative to a customer delivery base plate in the same general direction.

A similar confinement is provided for in U.S. Pat. No. 4,867,628. In this patent apparatus is described for dispensing a video cassette from, and for inserting a video cassette into, a plurality of individual trays of a bank of trays. To this end a moveable housing is provided. Such housing also serves to transfer a video cassette to and from a receiver tray. Movement of the video cassette relative to such moveable housing is along the same axis whether such movement is to or from the bank of trays or receiver tray. In addition, the apparatus described in this patent is a gravity feed system wherein the individual trays, moveable housing and receiver tray are each angulated (inclined) such that gravity feed may be utilized.

U.S. Pat. No. 4,563,120 is of similar interest in that a carriage is provided for retrieving and storing a video cassette relative to storage supports which are angulated such that gravity feed may be utilized. In addition, in this patent movement of the video cassette relative to such carriage will be in the same axial direction from the beginning to the end of the retrieval and storage cycles.

The use of a moveable housing which moves a video cassette relative to a plurality of video cassette shelves and a plurality of video cassette players is known in the art. In such apparatus, the moveable housing includes means for causing a video cassette which is stored upon an angulated shelf to be fed into the moveable housing under the influence of gravity and in a particular direction relative to the moveable housing. The moveable housing is then moved in an X and Y direction, as required, into alignment with a select video player, and the video cassette is then pushed therein in the same general direction relative to the moveable housing. The moveable housing includes means for also causing the video cassette to be fed in the same general direction from the cassette player back into the moveable housing under the influence of gravity upon completion of the playing of the video cassette. To this end, the video cassette player is also angulated. The moveable housing is then again moved in an X and Y direction, as required, into alignment with a video cassette shelf and the video cassette is pushed therein in the same general direction relative to the moveable housing.

It will be apparent to those skilled in the art that a plurality of video cassette shelves and a plurality of video cassette players which are oriented at an angle will take up a considerable amount of space. It will also be apparent that a transporting unit which houses a video cassette being transferred between a shelf and a cassette player in which movement of the video cassette to and from such transporting unit is in the same general direction or along the same axis from the beginning to the end of the retrieval and storage cycles will provide a limited number of paths along which a video cassette can be moved.

It is an object of this invention to provide an automated video cassette library apparatus including a cassette transport unit having a cassette carrying cavity therein and including means for transferring a cassette in a first direction and in a second direction relative to the cassette carrying cavity, the second direction being perpendicular to the first direction.

Yet another object is to provide such apparatus which includes a cassette transport unit for positively transferring a select video cassette to and from any one of a plurality of vertically stacked and horizontally disposed video cassette shelves and video cassette players adjacent thereto without relying upon gravity feed.

Another object is to provide such apparatus which will provide a large quantity of video cassettes and a substantially smaller quantity of video cassette players.

A further object is to provide such apparatus which will provide a plurality of various programs and a plurality of video cassettes for each program and a smaller plurality of video cassette players any one of which is capable of playing any of the video cassettes.

Another object is to provide such apparatus which is compact.

Yet a further object is to provide such apparatus which includes a cassette transport unit for positively gripping a select video cassette to remove such cassette from a select video cassette player, such unit further serving to push a select video cassette into a select video cassette player.

Another object is to provide such apparatus which is modular.

A further object is to provide such apparatus including a compact housing and a modular video cassette storage cartridge which contains a plurality of video cassettes and may readily be inserted into and removed from such housing and accessed by a cassette transport unit for transferring video cassettes to and from such storage cartridge.

Yet another object is to provide such apparatus which includes a cassette transport unit for quickly transferring a select video cassette from a video cassette shelf to another video cassette shelf or to a video cassette player and from a video cassette player to another video cassette player or to a video cassette shelf.

SUMMARY OF THE INVENTION

This invention achieves these and other results by providing an automated cassette library apparatus which includes a housing having horizontally disposed therein a plurality of cassette shelves and a plurality of cassette players. A cassette transport unit is also disposed horizontally within the housing, the cassette transport unit having a cassette carrying cavity therein. Such unit includes first means disposed in the cassette carrying cavity for selectively transferring a cassette in the direction of a first axis from a cassette shelf into the cassette carrying cavity in a first mode and from the cassette carrying cavity to a cassette shelf in a second mode, and second means disposed in the cassette carrying cavity for selectively transferring a cassette in the direction of a second axis which is perpendicular to the first axis from the cassette carrying cavity to a cassette player in a third mode and from a cassette player into the cassette carrying cavity in a fourth mode. Third means is disposed in the housing for selectively transporting the cassette transport unit in the direction of a third axis which is perpendicular to the first axis and the second axis. Fourth means is disposed in the housing for selectively transporting the cassette transport unit in the direction of the second axis.

BRIEF DESCRIPTION OF THE DRAWINGS

This invention may be clearly understood by reference to the attached drawings in which.

DESCRIPTION OF THE PREFERRED EMBODIMENT

Figure 1:
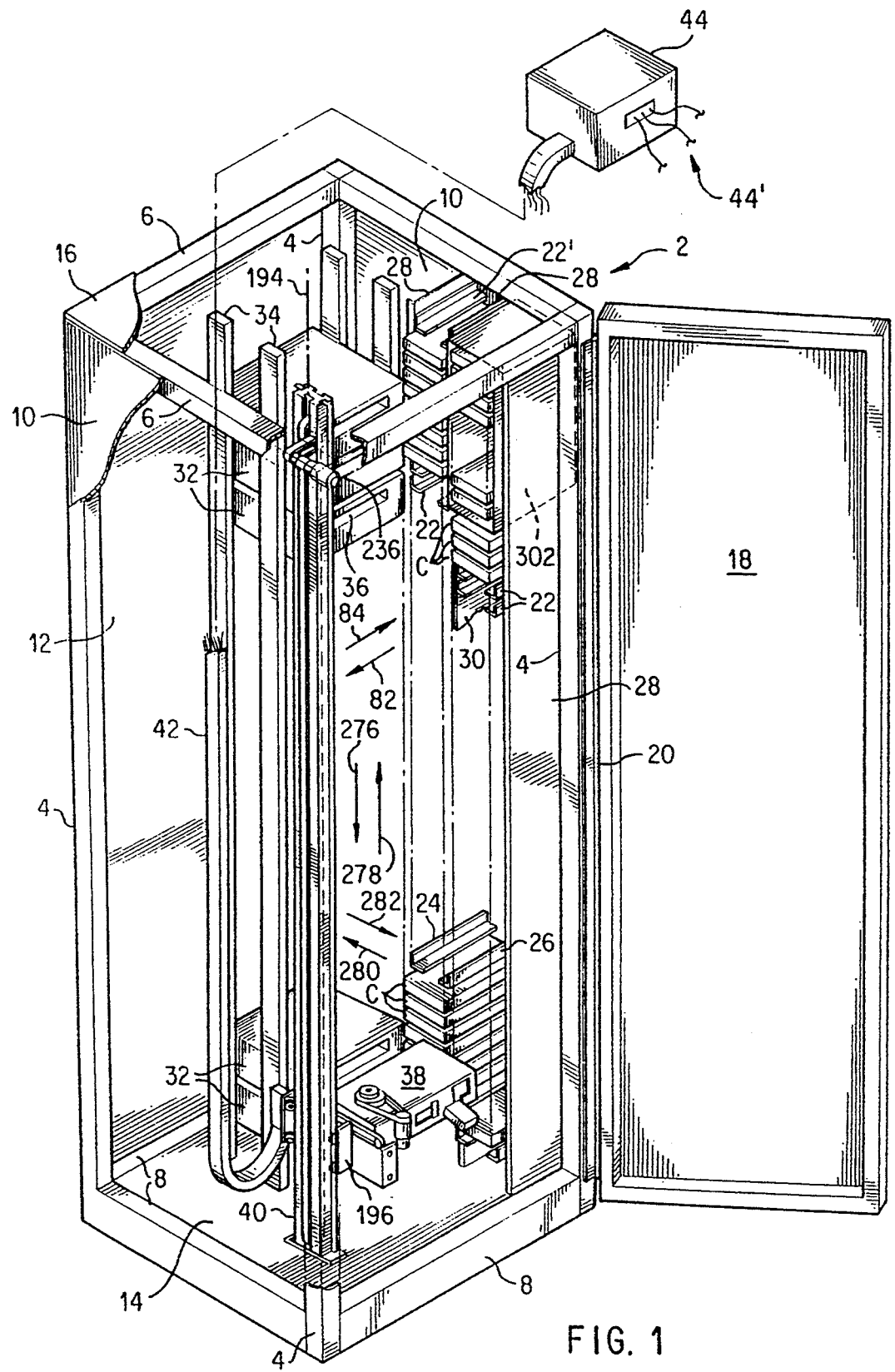
FIG. 1 is a perspective view of an automated cassette library apparatus embodying the present invention.

The embodiment of this invention which is illustrated in the drawings is particularly suited for achieving the objects of this invention. FIG. 1 depicts an overall view of an automated cassette library apparatus of the present invention. The embodiment described herein is particularly useful for use with video cassettes although it is equally useful with other types of cassettes such as, for example, audio cassettes. In the preferred embodiment, a housing or cabinet 2 is provided including vertical frame members 4, upper horizontal frame members 6, and lower horizontal frame members 8. Attached to such frame members are side panels 10, a rear panel 12, base panel 14 and a top 16. A framed front access panel 18 is attached to a vertical frame member 4 by means of hinges 20. The housing 2 provides an enclosure of metal or other material which is suitable for shielding RF frequencies.

Referring to FIG. 1, a plurality of cassette shelves 22 is horizontally disposed within the housing 2, each shelf being parallel to the base panel 14. Each shelf 22 is formed by opposing angle members 24 and 26 which are attached to opposing supports 28 as depicted in the drawing. Such supports 28 are attached to the frame of the housing 2 in any known manner. Each shelf 22 is dimensioned to receive a video cassette C, the front 30 of each shelf being open for easy access to a respective video cassette C as described herein. In the preferred embodiment there are a total of ninety nine video cassette shelves which are stacked vertically one above the other in two columns within housing 2 as depicted in FIG. 1. The front 30 of each shelf 22 faces an opposite side panel 10. Typically, an individual video cassette will be provided in each shelf 22 with the exception of a buffer shelf 22' described herein. Individual cassette titles may include any number of duplicates, as desired.

A plurality of video cassette players 32 is also disposed within housing 2. As depicted in FIG. 1, each video cassette player 32 rests upon a respective shelf (not shown) which is attached to vertical supports 34 which are attached to housing 2 in any known manner. In the preferred embodiment there are sixteen individual video cassette players which are stacked vertically within housing 2 one above the other as depicted in FIG. 1. Each video cassette player 32 is disposed horizontally relative to the base panel 14, and the access opening 36 of each video cassette player faces the front of the housing. Each video cassette player 32 is non-invasive and requires no internal changes. Operation of each video cassette player 32 is in response to command signals as described in the foregoing applications.

Means is provided horizontally disposed within housing 2 and moveable relative to the video cassette shelves and video cassette players for transferring a select video cassette C from a particular video cassette shelf to another particular video cassette shelf or to a particular video cassette player, or from a particular video cassette player to another particular video cassette player or a particular video cassette shelf. In the preferred embodiment such means comprises a cassette transport unit 38 which is mounted upon a mast 40 for vertical movement within housing 2 relative to the video cassette shelves and video cassette players. Cassette transport unit 38 is parallel to base panel 14. Power and control signals are provided to cassette transport unit 38 by means of a flexible wiring harness 42 which extends from the cassette transport unit 38 to a control means 44 diagramatically depicted in FIG. 1 at the top of the housing 2. As described in greater detail in the foregoing applications referred to above, control means 44 includes conductors 44' including a conductor electrically connecting the control means to a source of power, a plurality of conductors electrically connecting the control means to a plurality of remote locations such as to television sets in rooms of a hotel, and a conductor electrically connecting the control means to a central or host computer means. In the preferred embodiment, electrical power will be 120 VAC, single phase, 60 Hz with a maximum of 15 amps for each housing. Each housing will be provided with a standard grounded plug, not shown. Control means 44 is preferably mounted within housing 2 in a location convenient for access or maintenance.

Figure 2:
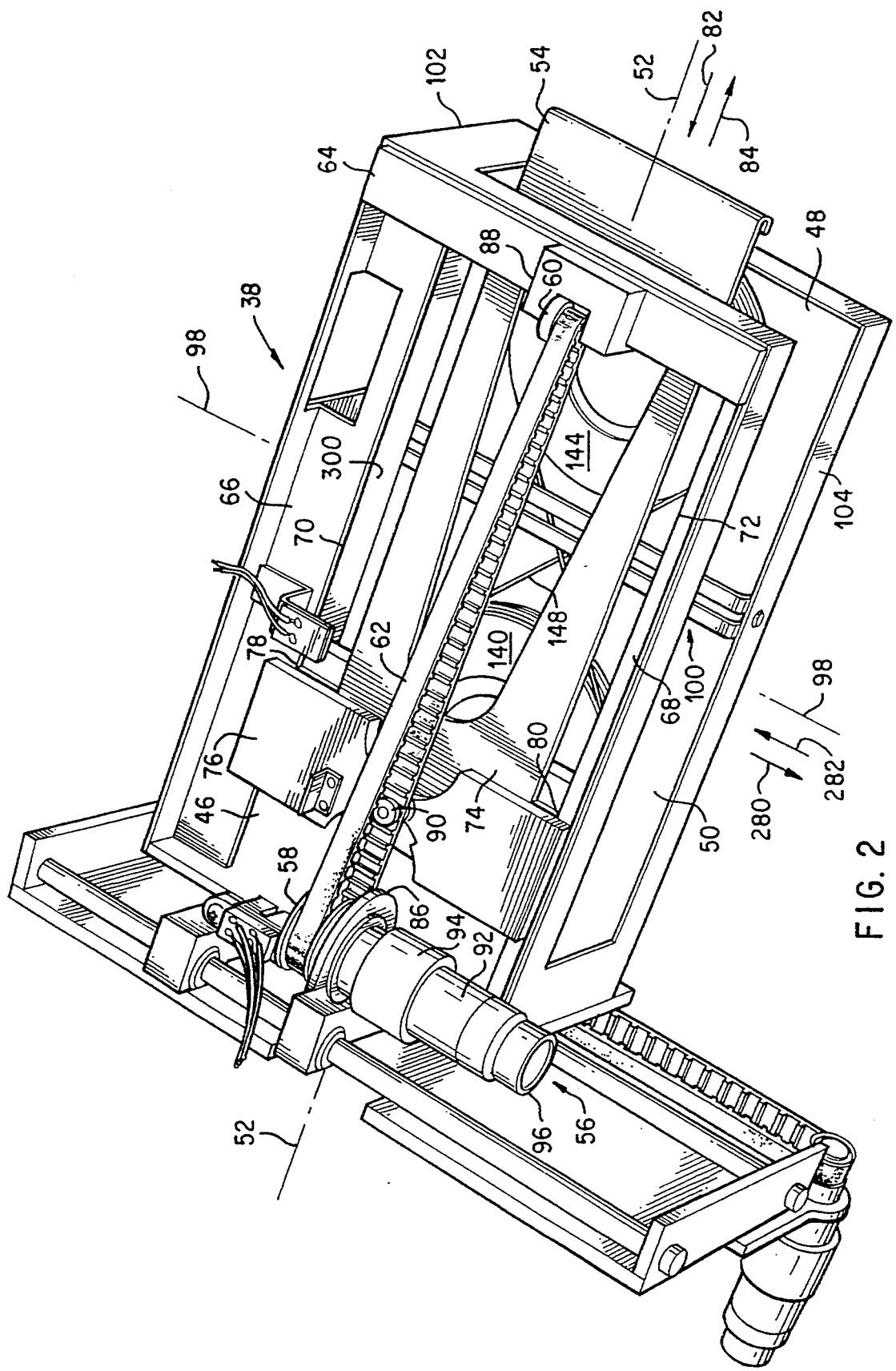
FIG. 2 is a partial perspective view of one embodiment of a cassette transport unit of the present invention viewing such unit from the rear and the bottom thereof.

With reference to FIG. 2, the cassette transport unit 38 includes a cassette carrying cavity 46. Access to cavity 46 from a video cassette shelf 22 is provided at side access opening 48. Similarly, access to cavity 46 from a video cassette player 32 is provided at rear access opening 50. A first means is provided disposed in the cassette carrying cavity 46 and moveable in the direction of a first axis 52 for selectively transferring a cassette C from a video cassette shelf 22 into the cassette carrying cavity 46 in a first mode and from the cassette carrying cavity 46 to a video cassette shelf 22 in a second mode. In the preferred embodiment such means includes a plate 54, bi-directional motor 56, pulleys 58 and 60 and endless belt 62. Plate 54 has a longitudinal axis which extends in the direction of axis 52 as depicted in FIG. 2. Plate 54 is movably mounted to the cassette transport unit 38 and may be reciprocated into and out of cassette carrying cavity 46. In particular, the bottom 64 of the cassette transport unit 38 includes base portions 66 and 68 which provide edges 70 and 72, respectively. One end 74 of the plate 54 includes a slide member 76 which includes grooves 78 and 80 at opposite edges thereof. Grooves 78 and 80 mate with edges 70 and 72, respectively, such that plate 54 is free to move in the direction of arrow 82 in the first mode and in the direction of arrow 84 in the second mode as the slide member 76 slides upon the edges 70 and 72.

Bi-directional motor 56 is mounted upon cassette transport unit 38 at flange 86. Pulley 58 is operatively coupled to motor 56. In particular, pulley 58 is attached to an output shaft (not shown) of motor 56 in a known manner such that energization of the motor causes the output shaft and pulley attached thereto to rotate in one direction or the other depending upon the directional mode of the motor. The other pulley 60 is rotatably mounted to the cassette transport unit 38 at pulley mounting member 88. Pulleys 58 and 60 are spaced from each other along a line which extends in the direction of axis 52 as depicted in FIG. 2. Endless belt 62 is operatively coupled to pulleys 58 and 60 and is attached at 90 to the slide member 76 of plate 54. In the preferred embodiment, the bi-directional motor 56 is a servo motor and the endless belt 62 is a timing belt mounted upon timing belt pulleys 58 and 60. For example, in the preferred embodiment motor 56 includes a servo motor 92, a gear box 94 having a gear ratio of 40 to 1, and a magnetic pulse-type sixteen line encoder 96 having 64 counts per revolution.

A second means is provided disposed in cassette carrying cavity 46 and moveable in the direction of a second axis 98, which is perpendicular to axis 52, for selectively transferring a cassette C from the cassette carrying cavity 46 to a video cassette player 32 in a third mode and from a video cassette player 32 to the cassette carrying cavity 46 in a fourth mode. In the preferred embodiment, such means comprises a pair of gripping arms described herein (not shown in FIG. 2) which are urged against a side of a video cassette C to push it out of the cassette carrying cavity in the third mode and which grip a video cassette C ejected by a video cassette player to pull the cassette into the cassette carrying cavity in the fourth mode. When in the fourth mode, such gripping arms may be provided to grip the edges of a cassette to hold the cassette therebetween. Alternatively, and in the preferred embodiment, such gripping arms may be provided to grip the top and bottom of a cassette to hold the cassette therebetween.

Figure 3:
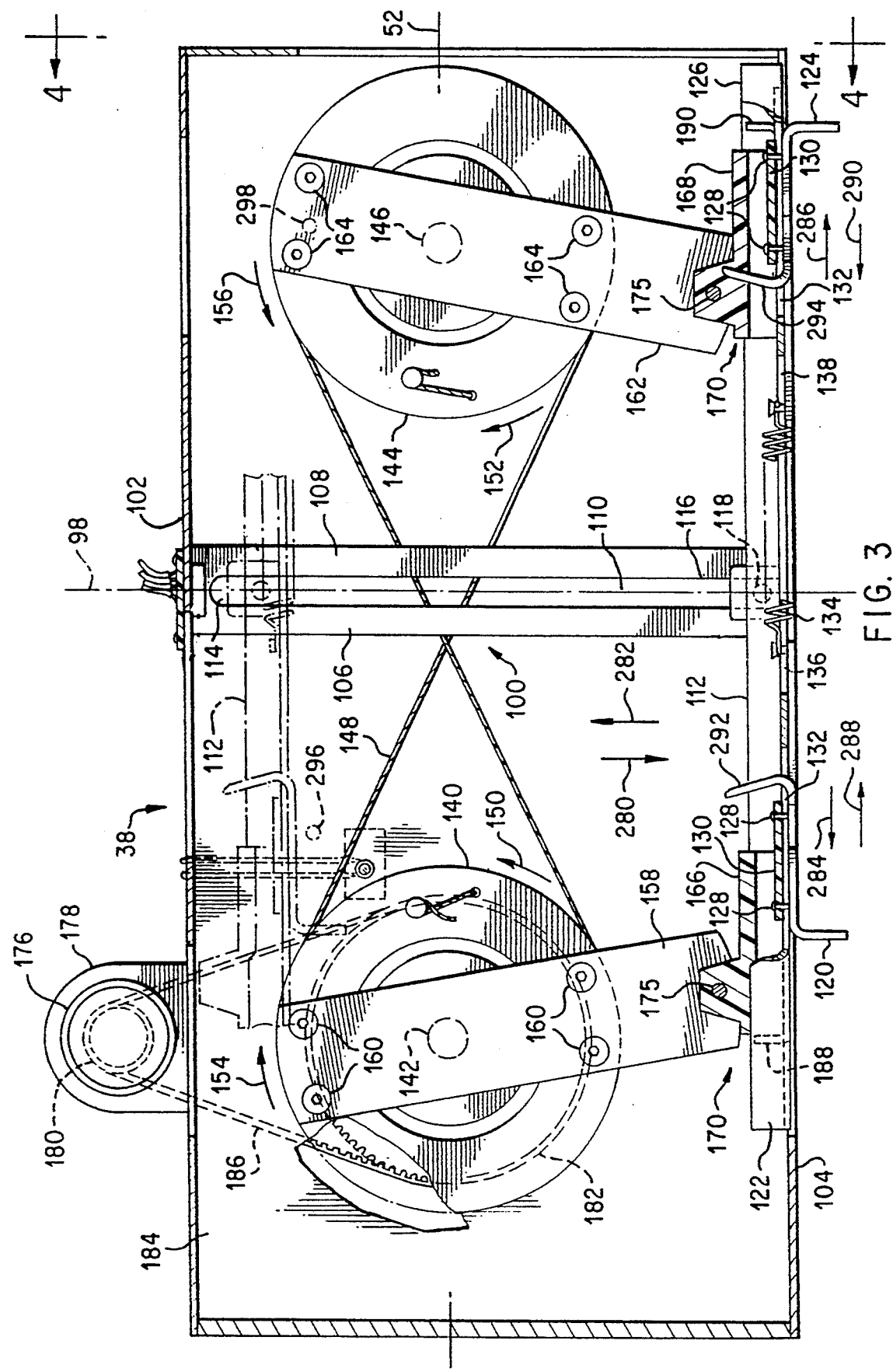
FIG. 3 is a plan view partially depicting a cassette carrying cavity of said cassette transport unit with the bottom removed therefrom.
Figure 4:
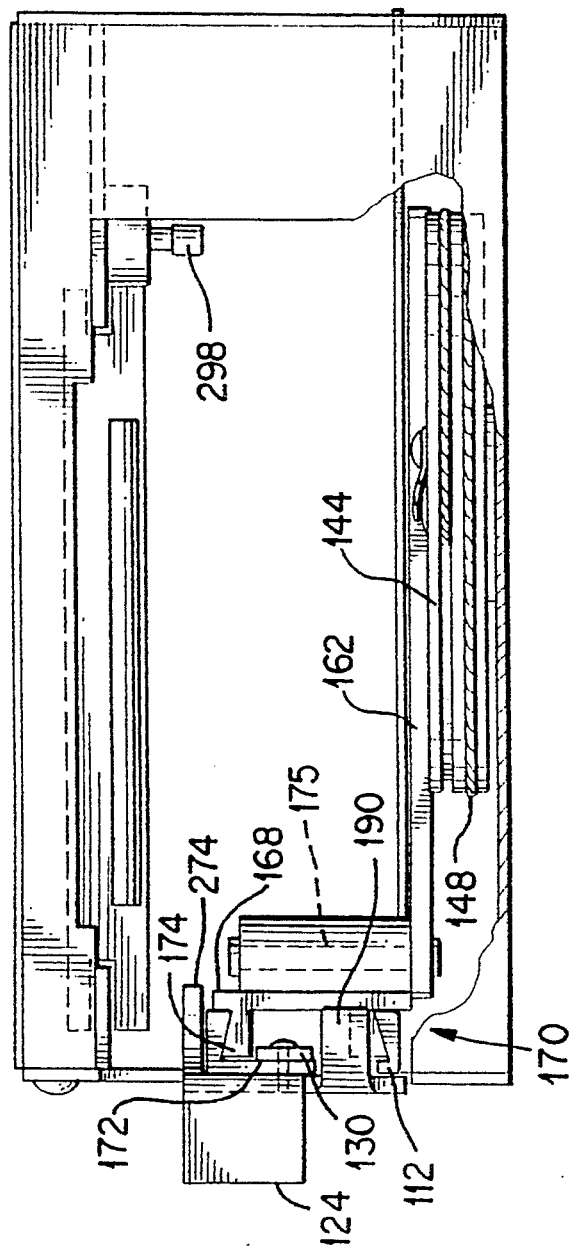
FIG. 4 is an inverted end view taken along the line 4—4 of FIG. 3.

The preferred embodiment of the second means is depicted in FIGS. 2 and 3. In particular, a guide member 100 is disposed within the cassette carrying cavity 46 extending in the direction of axis 98 from the front 102 to the rear 104 of the cassette transport unit 38. Guide member 100 includes a pair of parallel bars 106 and 108 which are spaced at 110 and have opposite ends attached to the front 102 and rear 104 of the cassette transport unit 38 as depicted in the drawings. A slidable track 112 extends in the direction of axis 52 and includes means which mates with guide member 100 for controlling the direction of movement of the track 112 from one end 114 of guide member 100, as partially shown in phantom lines in FIG. 3, to an opposite end 116 of guide member 100, as shown in solid lines in FIG. 3. In the preferred embodiment such controlling means includes a protuberance 118 which extends from the track 112 into the space 110 between bars 106 and 108. Means is movably mounted to track 112 for abutting a cassette C in the third mode of operation and for gripping a cassette C in the fourth mode of operation. In the embodiment of FIG. 3 such abutting and gripping means includes a first gripping arm 120 which is movably mounted to a first end 122 of the track 112 and disposed relative to the cassette transport unit 38 for engaging one surface of a cassette C in the fourth or gripping mode of operations, and a second gripping arm 124 movably mounted to an opposite second end 126 of the track 112 and disposed relative to the cassette transport unit for engaging an opposite surface of the cassette in the fourth or gripping mode of operation. Each gripping arm 120 and 124 is movably mounted to track 112 by means of screws 128 which extend through a respective backing member 130, and a respective slot 132 in track 112, into a respective gripping arm 120 and 124, as depicted in FIGS. 3 and 4. The first gripping arm 120 is spring biased towards the second gripping arm 124 and to this end a spring 134 is attached to ends 136 and 138 of gripping arms 120 and 124, respectively.

Means is also provided which is mounted to the cassette transport unit 38 and to the track 112 for moving track 112 relative to guide means 100 in the third mode of operation and for moving track 112 relative to guide means 100 and also actuating the abutting and gripping means described herein in the fourth mode of operation. In particular, a pulley 140 is provided which is attached to an axle 142, the axle being rotatably mounted to the cassette transport unit 38 in any known manner. A pulley 144 is attached to an axle 146, the axle being rotatably mounted to the cassette transport unit in any known manner. Pulley 140 is spaced from pulley 146 along a line which extends in the direction of axis 52 as depicted in FIG. 3. Pulley 140 and pulley 144 are operatively coupled together for rotation in opposite rotational directions. For example, in viewing FIG. 3, a band 148 crosses itself as it extends from one pulley to the other such that rotation of pulley 140 in the direction of arrow 150 will cause rotation of pulley 144 in the direction of arrow 152, and rotation of pulley 140 in the direction of arrow 154 will cause rotation of pulley 144 in the direction of arrow 156. A crank arm 158 is attached to pulley 140 by screws 160, and a crank arm 162 is attached to pulley 144 by screws 164. A first abutment member 166 is slidable mounted to end 122 of track 112 and is pivotally coupled to crank arm 158. Similarly, a second abutment member 168 is movably mounted to end 126 of track 112 and is pivotally coupled to crank arm 162. In the preferred embodiment depicted in FIG. 4, in order to movably mount each abutment member 166, 168 to track 112, a tongue and groove-type coupling 170 is provided wherein each end of track 112 is provided with a groove 172 (only one end is shown in FIG. 4) and each abutment member 166, 168 (only abutment 168 is depicted in FIG. 4) is provided with a dovetail-shaped tongue 174 such that each abutment member is free to slide within a groove 172. Each abutment member 166, 168 is pivotally connected to a respective crank arm by means of a pivot pin 175. Means is provided for bi-directionally rotating the pulley 140. In the preferred embodiment, such means includes a bi-directional motor 176 mounted to the cassette transport unit 38 at flange 178.. A pulley 180 is operatively coupled to bi-directional motor 176. In particular, pulley 180 is attached to an output shaft (not shown) of motor 176 in a known manner such that energization of the motor causes the output shaft and pulley attached thereto to rotate in one direction or the other depending upon the directional mode of the motor. Another pulley 182 is attached to axle 142 which extends through the top surface 184 of the cassette transport unit 38. Pulleys 180 and 182 are spaced from each other along a line which extends in the direction of axis 98 as depicted in FIG. 3. The pulleys 1130 and 182 are operatively coupled together by a belt 186. In the preferred embodiment bi-directional motor 176 is a servo motor similar to bi-directional motor 56 with the exception that the gear ratio of motor 176 is 60 to 1. In the preferred embodiment, belt 186 is a timing belt mounted upon timing belt pulleys 180 and 182.

In the preferred embodiment, the gripping arm 120 includes a finger 188 positioned relative to end 122 of track 112 for engagement by abutment member 166 when track 112 approaches an end 116 of track 100 as described herein. Similarly, gripping arm 124 includes a finger 190 positioned relative to end 126 of track 112 for engagement by abutment member 168 when track 112 approaches end 116 of track 100 as described herein.

Figure 5:
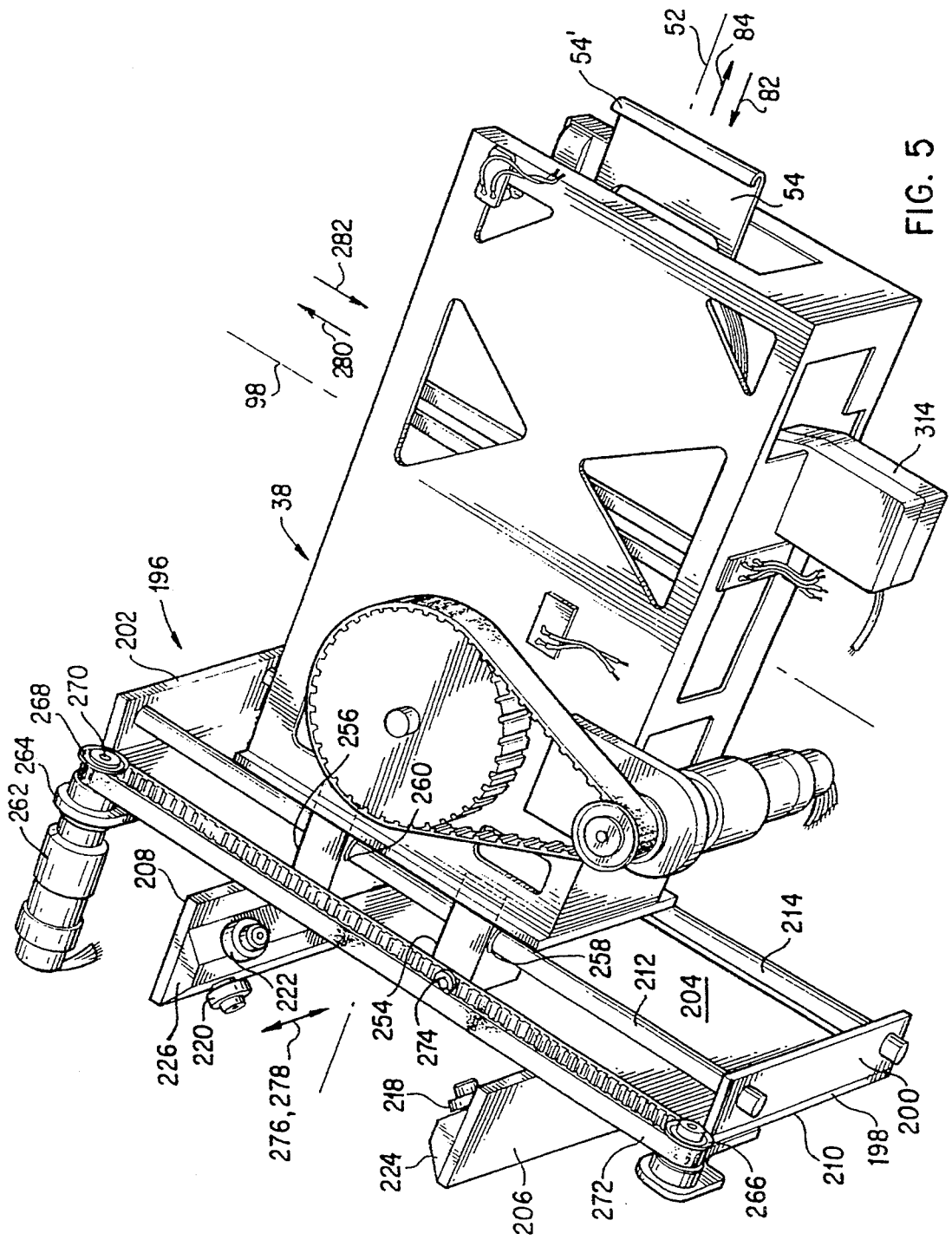
FIG. 5 is a partial perspective view of the cassette transport unit of FIG. 2 viewing such unit from the front and the top thereof.
Figure 6:
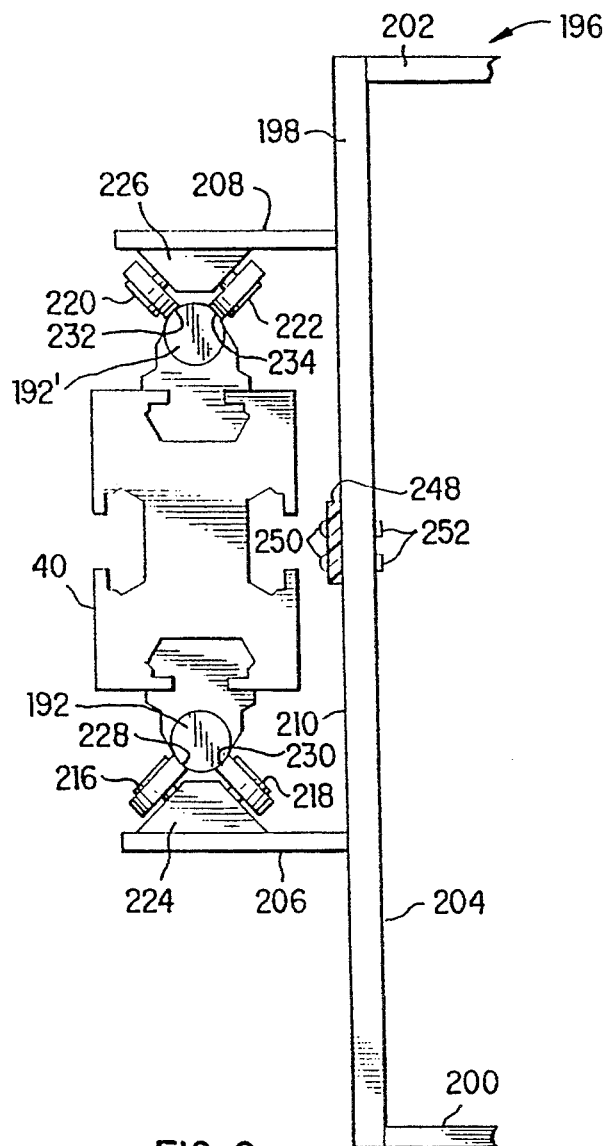
FIG. 6 is a diagrammatic plan view of one embodiment of a mast, tracks and carriage of the present invention.

Referring to FIGS. 1 and 6, in the preferred embodiment the mast 40 includes tracks 192, 192' which extend in the direction of an axis 194 which is perpendicular to axes 52 and 98. Means is provided which is movably mounted upon tracks 192,192' and attached to the cassette transport unit 38 for transporting the cassette transport unit relative to the video cassette shelves and the video cassette players in the direction of axis 194. To this end, and referring to FIGS. 1, 5 and 6, a carriage 196 is provided which is movably mounted to tracks 192, 192' and is attached to the cassette transport unit 38. In particular, carriage 196 includes a base plate 198 having end flanges 200 and 202 which extend from one surface 204 and intermediate flanges 206 and 208 which extend from an opposite surface 210. A pair of rods 212 and 214 extend between flanges 200 and 202. Pairs of rollers 216, 218 and 220, 222 are mounted upon supporting members 224 and 226, respectively, which are attached to flanges 206 and 208, respectively. Rollers 216, 218 engage portions 228 and 230, respectively, of track 192 and rollers 220, 222 engage portions 232 and 234, respectively, of track 192'. In this manner, the cassette transport unit 38 can be caused to move along tracks 192, 192' relative to the video cassette shelves and video cassette players in the direction of axis 194 as described herein.

Figure 7:
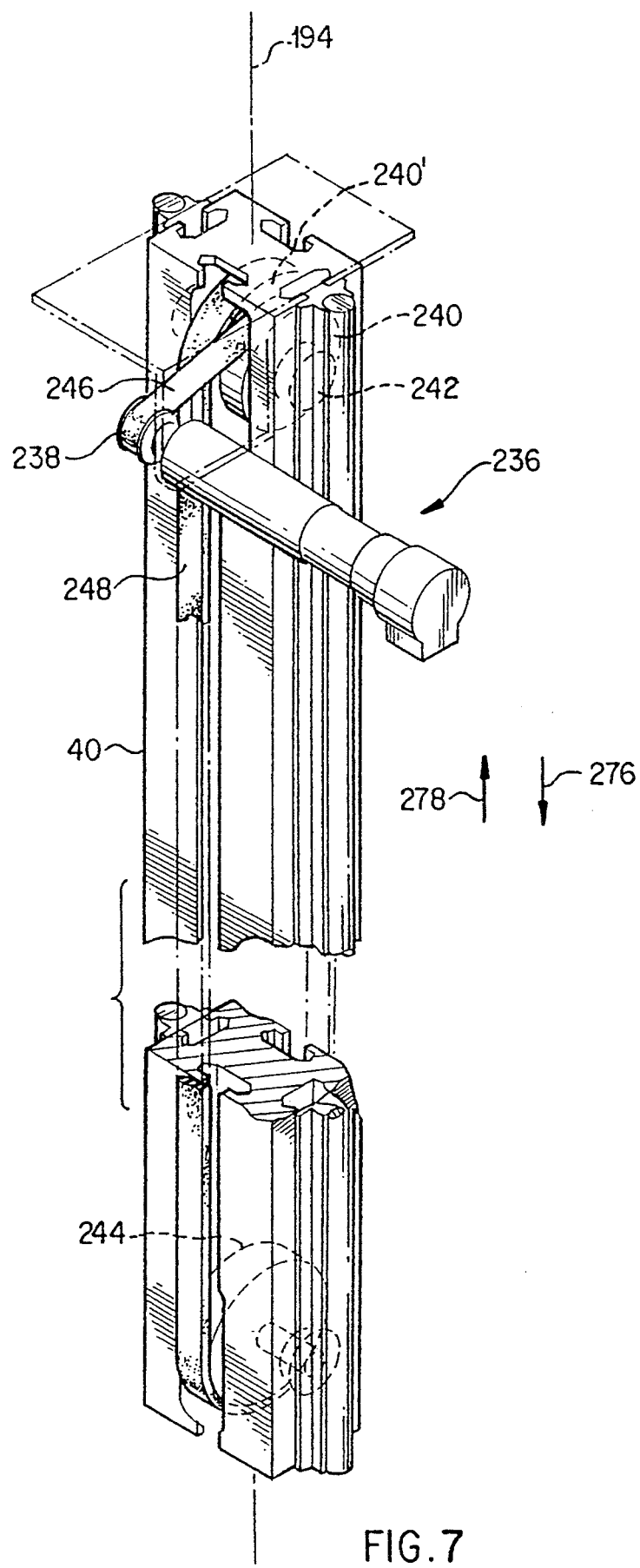
FIG. 7 is a partial perspective view of one embodiment of the mast and tracks of the present invention.

Referring to FIGS. 1 and 7, a bi-directional motor 236 is mounted near the upper end of mast 40 by a flange (not shown). A pulley 238 is operatively coupled to motor 236. In particular, pulley 238 is attached to an output shaft (not shown) of motor 236 in a known manner such that energization of the motor will cause the output shaft and pulley 238 attached thereto to rotate in one direction or the other depending upon the mode of operation of the motor. Two other pulleys 240 and 240' are attached to opposite ends of an axle 242, which is rotatably mounted near the upper end of mast 40 in a known manner. Another pulley 244 is also rotatably mounted near the lower end of mast 40. Pulleys 238 and 240 are spaced from each other as depicted in FIG. 7 and are operatively coupled together by a belt 246. Pulleys 240' and 244 are spaced from each other along a line which extends in the direction of axis 194 and are operatively coupled together by a belt 248 which is attached to the base plate 198 of carriage 196 by bolts 250 and nuts 252 as depicted in FIG. 6. In the preferred embodiment bi-directional motor 236 is a servo motor similar to bi-directional motor 56 with the exception that motor 236 embodies an optical encoder having 2000 counts per revolution. Belts 246 and 248 are timing belts, and pulleys 238, 240, 240', and 244 are timing belt pulleys.

In the preferred embodiment the cassette transport unit 38 is movably mounted relative to the carriage 196. In particular, flanges 254 and 256 extend from the cassette transport unit 38 as depicted in FIG. 5. Bores extend through flanges 254 and 256, respectively. Rod 212 extends through bores 258 and 260 and rod 214 extends through similar bores (not shown). In this manner, the cassette transport unit 38 can be caused to move along rods 212 and 214 in the direction of axis 98 towards and away from video cassette players 32 as described herein. Means is attached to carriage 196 for moving the cassette transport unit 38 in the direction of axis 98. In particular, a bi-directional motor 262 is mounted to the base plate 198 at flange 264. A pulley 266 is rotatably mounted to base plate 198. Another pulley 268 is operatively coupled to the bi-directional motor 262. In particular, pulley 268 is attached to an output shaft 270 of motor 262 in a known manner such that energization of the motor will cause the output shaft and pulley attached thereto to rotate in one direction or the other depending upon the mode of operation of the motor. Pulleys 266 and 268 are spaced from each other along a line which extends in the direction of axis 98. An endless belt 272 is operatively coupled between pulleys 266 and 268 and is attached by bolt 274 to flange 254 as depicted in FIG. 5. In the preferred embodiment, bi-directional motor 262 is a servo motor identical to servo motor 56, and belt 272 is a timing belt mounted upon timing belt pulleys 266 and 268.

In describing the operation of the automated video cassette library described herein it is assumed that each of the motors is connected to a source of power and to control apparatus. An example of such source of power and control apparatus is described in the applications referred to above and incorporated by reference herein. With the foregoing in mind, the automated video cassette library will first be described in a manner of operation wherein it is desired to move a video cassette from a select video cassette shelf to a select video cassette player.

With reference to FIGS. 1, 6 and 7, upon receipt of a customer demand to view a particular video cassette, command signals are sent by control means 44 to energize servo motor 236 and rotate pulley 238 in a direction which depends upon whether it is necessary to raise or lower the cassette transport unit 38 to reach the level of the desired video cassette. Assuming it is necessary to lower unit 38, pulley 238 will be rotated in a clockwise direction when viewing FIG. 7. Pulley 238 will be rotated in a counterclockwise direction when it is necessary to raise unit 38. Assuming by way of example the lowering of unit 38, such clockwise rotation of pulley 238 will cause clockwise rotation of pulley 240, which is operatively coupled to pulley 238 by belt 246, and clockwise rotation of pulley 240', pulleys 240 and 240' being attached to common axle 242. Clockwise rotation of pulley 240' will cause clockwise rotation of belt 248 which extends between pulleys 240' and 244. Since belt 248 is attached to carriage 196 as described herein, clockwise rotation of belt 248 will lower carriage 196 and cassette transport unit 38 attached thereto in the direction of arrow 276 to the required level adjacent the select video cassette shelf 22.

Figure 8A:
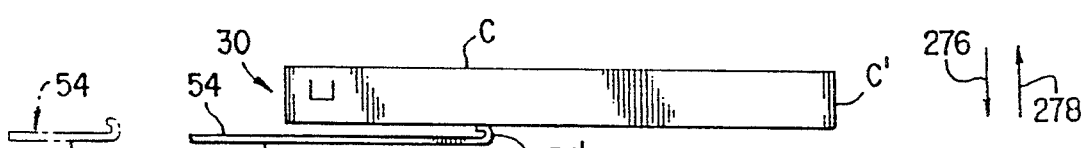
FIGS. 8A and 8B diagrammatically depict a video cassette being transferred from a cassette shelf to a cassette transport unit.
Figure 8B:
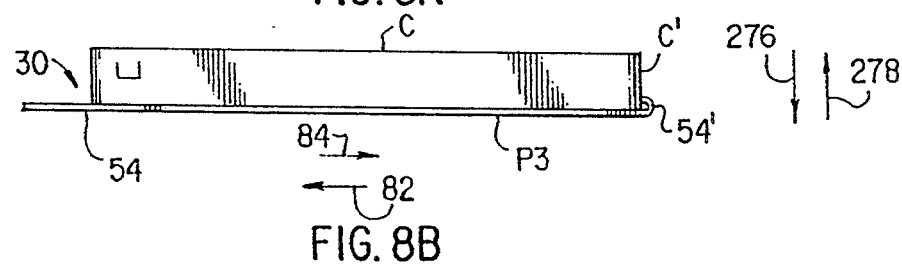

With reference to FIG. 2, and assuming that a video cassette C is to be retrieved from the vertical column of shelves 22 nearest the front of the housing, command signals are also sent by control means 44 to energize servo motor 56 and rotate pulley 58 in a counter clockwise direction. Since plate 54 is attached to belt 62 at 90, such rotation of pulley 58 will cause plate 54 to move in the direction of arrow 8.4. The desired vertical positioning of cassette transport unit 38 having been reached, plate 54 will enter the select video cassette shelf 22 supporting the desired video cassette C at its front 30 and move under the video cassette C housed in such video cassette shelf. In particular, and with reference to FIGS. 8A and 8B, plate 54 is depicted, relative to cassette carrying cavity 46, in a fully retracted position P1, a partially extended position P2 and a fully extended position P3. Plate 54 will move in the direction of arrow 84 and into the particular shelf 22 (not shown) under a video cassette C as depicted at P2 in FIG. 8A. When plate 54 is completely under cassette C such that the flange 54' is beyond edge C', pulley 238 will be rotated by servo motor 236 in a counterclockwise direction to rotate belt 246 in a counterclockwise direction to raise carriage 196 and cassette transit unit 38 attached thereto in the direction of arrow 278 until the edge C' of the video cassette furthest from the front 30 of the shelf 22 is engaged by flange 54' of plate 54 as depicted at P3 in FIG. 8B. Under the command of control means 44, servo motor 56 will then rotate pulley 58 in a clockwise direction which will cause plate 54 to move in the direction of arrow 82, the flange 54' serving to pull the select video cassette C in the direction of arrow 82 and into the cassette carrying cavity 46 of the cassette transport unit 38.

If it is required to retrieve a video cassette C from the vertical column of shelves 22 furthest from the front of the housing, when the desired vertical positioning of cassette transport unit 38 has been reached, command signals are sent by control means 44 to move the cassette transport unit 38 in the direction of arrow 280. In particular, and with reference to FIG. 5, command signals energize motor 262 and rotate pulley 268 in a counterclockwise direction. Such counterclockwise rotation of pulley 268 will cause belt 272 to rotate in a counterclockwise direction. Since belt 272 is attached to the cassette transport unit 38 at 274, counterclockwise rotation of belt 272 will cause cassette transport unit 38 to slide along rods 212 and 214 in the direction of arrow 280 until the cassette transport unit 38 is in position next to the column of shelves furthest from the front of the housing. When in such position, command signals are sent by control means 44 to energize servo motor 56 to cause reciprocation of plate 54 as described above to retrieve the desired video cassette C.

When the video cassette C is disposed within the cassette carrying cavity 46, and with reference to FIGS. 1, 6 and 7, command signals are also sent by control means 44 to raise or lower the cassette transport unit 38, if necessary, to a select video cassette player 32. Assuming that the cassette transport unit 38 must be raised, command signals again energize servo motor 236 and rotate pulley 238 in a counterclockwise direction when viewing FIG. 7. Such counterclockwise rotation of pulley 238 will cause counterclockwise rotation of pulleys 240 and 240' causing belt 248 to be rotated in a counterclockwise direction. Since belt 248 is attached to carriage 196, counterclockwise rotation of belt 248 will raise carriage 196 and cassette transport unit 38 attached thereto in the direction of arrow 278 to the required level adjacent the select video cassette player 32.

With reference to FIG. 5, command signals are also sent by control means 44 to move the cassette transport unit 38 towards the select video cassette player 32. To this end, command signals energize motor 262 and rotate pulley 268 in a counterclockwise direction. Such counter clockwise rotation of pulley 268 will cause belt 272 to rotate in a counterclockwise direction. Since belt 272 is attached to the cassette transport unit 38 at 274, counterclockwise rotation of belt 272 will cause cassette transport unit 38 to slide along rods 212 and 214 in the direction of arrow 280 towards the select video cassette player 32.

Figure 9A:
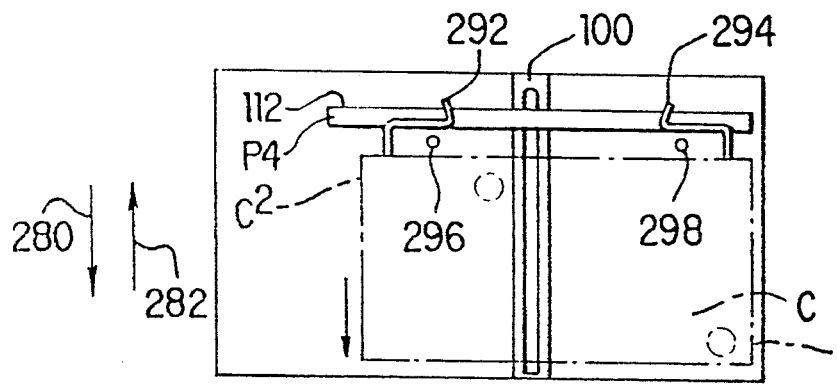
FIGS. 9A to 9E diagrammatically depict a video cassette being transferred to and from a cassette transport unit relative to a cassette player.
Figure 9B:
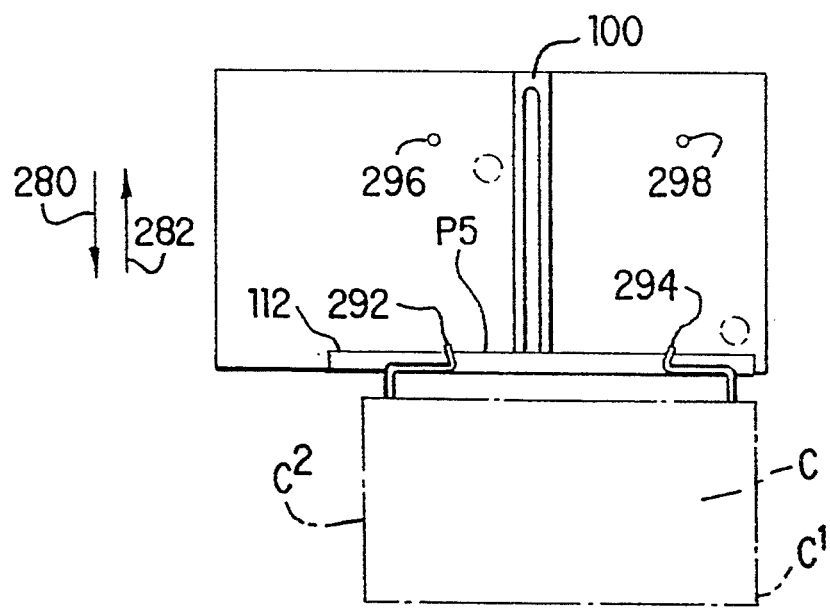

With reference to FIGS. 3, 9A and 9B, command signals are also sent by control means 44 to move the video cassette C from the cassette carrying cavity 46 and into the select video cassette player 32. When the video cassette C is disposed within the cassette carrying cavity 46, the track 112 will be positioned at end 114 of guide member 100 as partially depicted in phantom lines in FIG. 3 and as diagrammatically depicted in FIG. 9A. Command signals are sent by control means 44 to energize servo motor 176 and rotate pulley 180 in a clockwise direction when viewing FIG. 3. Since pulley 180 is operationally coupled to pulley 182 by belt 186, such rotation of pulley 180 will cause pulley 182 to also rotate in a clockwise direction. Since pulley 182 and pulley 140 are attached to a common axle 142, such rotation of pulley 182 will cause pulley 140 and crank arm 158 attached thereto to rotate in the direction of arrow 154. Pulley 144 and crank arm 162 attached thereto will be rotated in the direction of arrow 156 since pulleys 140 and 144 are operationally coupled by band 148 as described herein. Such rotation of crank arm 158 in the direction of arrow 154 and of crank arm 162 in the direction of arrow 156 will cause track 112, which is coupled by means of abutment members 166, 168 to arms 158 and 162 at pins 174, to slide in the direction of arrow 280 from end 114 of guide member 100 to end 116 to the position shown in solid lines in FIG. 3 and diagrammatically in FIG. 9B. The cassette transport unit 38 will be distanced from an access opening 36 of a video cassette player 32 such that such movement of track 112 will cause gripping arms 120 and 124 to push the video cassette C in the direction of arrow 280 out of the cassette carrying cavity 46 and towards a select video cassette player 32; that is, the gripping arms 120 and 124 will push the video cassette C into the access opening 36 of the select video player 32 at which time command signals from control means 44 will energize servo motor 176 and rotate pulley 180 in a counterclockwise direction when viewing FIG. 3. Such counterclockwise rotation of pulley 180 will cause pulley 182, pulley 140 and crank arm 158 to rotate in the direction of arrow 150. Pulley 144 and crank arm 162 will be rotated in the direction of arrow 152. Such rotation of crank arm 158 in the direction of arrow 150 and of crank arm 162 in the direction of arrow 152 will cause track 112 to slide in the direction of arrow 282 from end 116 of guide member 100 to end 114 to the position shown in phantom lines in FIG. 3 and diagrammatically in FIG. 9A. At the end of the foregoing sequence of operation, command signals are sent to the select video cassette player 32 to energize the player so that the selected video cassette may be viewed by the customer, and the apparatus is ready for the next customer demand. A second customer may access the apparatus while the previous customer is viewing a video cassette program by repeating the foregoing procedure. In particular, another video cassette may be selected for playing upon another video cassette player while the previously selected video cassette is being played upon the previously identified video cassette player. It will be apparent that this process can be repeated until all of the video cassette players in the housing 2 are in use.

Figure 9C:
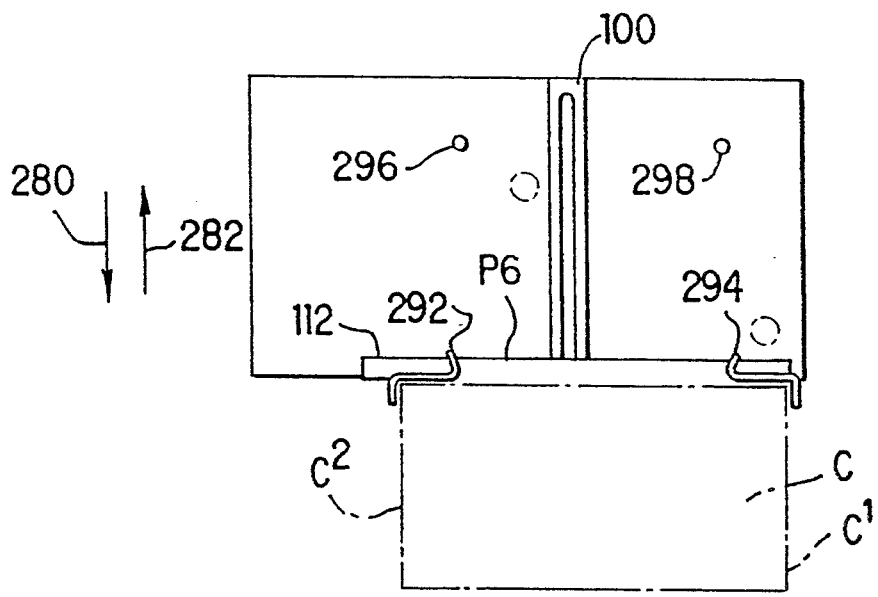
Figure 9D:
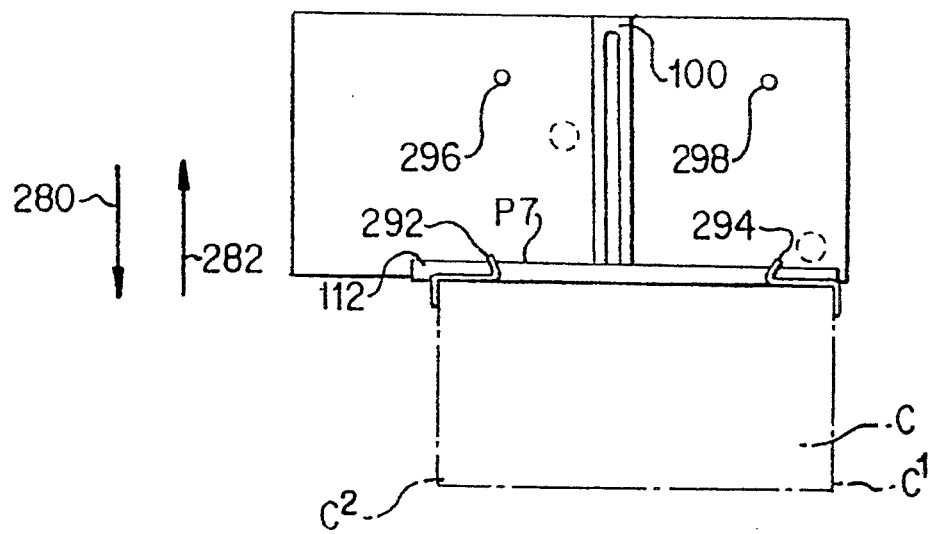
Figure 9E:
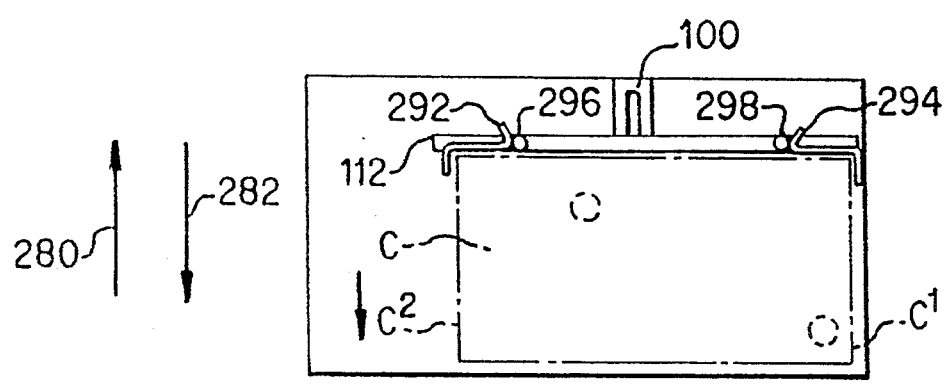

When it is desired to move a video cassette C from a select video cassette player to a select video cassette shelf, command signals from control means 44 energize servo motor 236 as described herein to cause any required vertical movement of cassette transport unit 38 to the select video cassette player 32. Command signals are then sent to energize servo motor 262 as described herein to cause the video cassette unit 38 to be moved towards the select video cassette player 32 and to energize servo motor 176 as described herein to rotate crank arms 158 and 162 to move the gripping arms 120 and 124 towards the select cassette player 32. In the preferred embodiment, when retrieving a video cassette C which has been ejected from a video cassette player 32, the ejected video cassette is gripped by gripping arms 120 and 124. With reference to FIG. 3, track 112 is depicted in solid lines at rear 104 of the cassette transport unit 38 as a result of the clockwise rotation of pulley 180 as described herein. Rear 104 faces the select video cassette player 32 and the ejected video cassette C, neither of which are depicted in FIG. 3. As noted herein, track 112 was caused to move from end 114 of guide member 100 towards end 116 by rotation of crank arms 158 and 162 in the direction of arrows 154 and 156, respectively. As track 112 is nearing end 116, continued rotation a crank arms 158 and 162 in the direction of arrows 154 and 156, respectively, will cause abutment members 166 and 168 to move in the direction of arrows 284 and 286, respectively. When track 112 is positioned near end 116, abutment members 166 and 168 abut fingers 188 and 190, respectively, and therefore such movement of the abutment member's will cause fingers 188 and 190 of respective gripping arms 120 and 124 to move against the bias of spring 134 in the direction of arrows 284 and 286, respectively, such that the gripping arms 120 and 124 extend beyond the edges $C^1$, $C^2$ of video cassette C as track 112 is moved all the way to the end 116 of guide member 100 as depicted in FIG. 9C. In order for gripping arms 120 and 124 to grip the edges $C^1$, $C^2$ of video cassette C as depicted in FIG. 9D, command signals energize servo motor 176 to rotate pulley 180 in a counterclockwise direction as depicted in FIG. 3 thereby causing crank arms 158 and 162 to rotate in the direction of arrows 150 and 152, respectively, as described herein. During such rotation, abutment members 166 and 168 move in the direction of arrows 288 and 290, respectively, disengaging respective fingers 188 and 190 and allowing gripping arms 120 and 124 to grip sides $C^2$ and $C^1$, respectively, of video cassette C under the tension of spring 134 which urges gripping arms 120 and 124 towards each other. Further movement of crank arms 158 and 162 in the direction of arrows 150 and 152, respectively, causes track 112 to move from end 116 of guide member 100 towards end 114, pulling the video cassette C into the cassette carrying cavity 46. As depicted in FIGS. 3 and 4, camming surfaces 292 and 294 extend from respective gripping arms 120 and 124. Cassette transport unit 38 further includes corresponding cam followers 296 and 298 which extend into cavity 46. When the video cassette C has been pulled into cavity 46 such that the video cassette is positioned upon plate 54 for subsequent removal from the cavity 46 by plate 54, camming surfaces 292 and 294 engage cam followers 296 and 298, respectively, as depicted in FIG. 9E, thereby camming the gripping arms 120 and 124 out of engagement with edges $C^2$, $C^1$ of video cassette C. A guide bar 300 is provided to abut the cassette C at the position where the gripping arms 120 and 124 are being cammed out of engagement with the cassette C so that upon further movement of the track 112 towards end 114 the cassette is stripped from gripping arms 120 and 124. Continued movement of the track 112 towards end 114 of guide member 100 moves camming surfaces 292 and 294 out of engagement with cam followers 296 and 298 allowing gripping arms 120 and 124 to move towards each other under the bias of spring 134 to their unloaded position as depicted in FIG. 9A without undesirably urging the cassette out of the cassette carrying cavity back towards the cassette player as a result of the gripping arms being abruptly urged towards each other under the force of spring 134. In the preferred embodiment, cam followers 296 and 298 are posts which extend into the path of camming surfaces 292 and 294 as depicted in FIG. 4, only camming surface 294 and cam follower 298 being shown in the drawing.

When the video cassette C has been pulled into the video cassette cavity 46 command signals are then sent to energize servo motors 236 and 262 to move cassette transport unit 38 as required to the desired video cassette shelf 22 as described hereinbefore. Command signals are then sent to energize servo motor 56 to cause plate 54 upon which cassette C now rests to move in the direction of arrow 84 as described hereinbefore to deliver cassette C into the selected video cassette shelf 22. Cassette transport unit 38 is then caused to be moved in the direction of arrow 276 in response to command signals sent to motor 236, as described hereinbefore, to deposit the cassette upon shelf members 24, 26 and move flange 54' below edge C' of cassette C. Plate 56 is then moved back into the video cassette cavity 46 as described hereinbefore. The apparatus is then ready for the next customer demand.

It will be apparent that the automated video cassette library described herein may respond to other command signals generated by control means 44 to move a video cassette C from one video cassette shelf 22 to another video cassette shelf 22 and to move a video cassette C from one video cassette player to another video cassette player.

In the preferred embodiment, the plurality of cassette shelves will include one or more buffer shelf 22'. In particulars when the housing 2 is fully loaded, all of the cassette shelves 22 will contain a video cassette C with the exception of buffer shelf 22'. Buffer shelf 22' is useful when it is desired to remove a video cassette from the operative system. For example, it may be desirable to remove a defective video cartridge so that it is not retained in its usual video cassette shelf 22. To this end, such defective tape may be transferred to buffer shelf 22' until such time as it is removed from the apparatus. Buffer shelf 22' has another use as described hereinafter.

In the preferred embodiment, a removable cartridge 302 is provided. Cartridge 302 is in the form of a removable box-like housing which includes a plurality of shelves (not shown) similar to shelves 22 each of which is suitable for supporting a video cassette C. Cartridge 302 is supported by a shelf formed by opposing angle members (not shown) similar to angle members 24 and 26. Cartridge 302 is particularly useful when it is desired to replace a plurality of existing video cassettes with a plurality of video cassettes having new titles. For example, in the preferred embodiment, cartridge 302 contains ten shelves for housing ten new video cassettes which are to replace ten existing video cassettes supported by shelves 22. In operation, an empty cartridge 302 is inserted into housing 2 as depicted in FIG. 1. As described in more detail in the applications referred to above, control signals from control means 44 energize various servo motors as described herein to transfer ten video cassettes from cassette shelves 22 to the ten empty video cassette shelves within the cartridge 302. The operator then removes the cartridge 302 and replaces it with another cartridge 302 which contains up to ten different video cassettes. Control signals from control means 44 again energize various servo motors as described herein to transfer each replacement video cassette from the cartridge 302 to a cassette shelf 22 previously emptied. The use of cartridge 302 in this manner provides for easy replacement of one group of video cassettes with another group of video cassettes. Cartridge 302 may contain more or less than ten video cassettes shelves, as desired.

Alternatively, the buffer shelf 22' may be used in combination with a fully loaded cartridge 302. In particular, a cartridge 302 containing ten new video cassettes supported by ten corresponding shelves may be inserted into housing 2 as depicted in FIG. 1. As described in more detail in the applications referred to above, control signals from control means 44 energize various servo motors as described herein to sequentially move a first cassette from a first shelf 22 to the buffer shelf 22'; move a first new cassette from cartridge 302 to such first cassette shelf; move the first cassette from the buffer shelf 22' to the vacant cassette shelf in the cartridge 302; move a second cassette from a second shelf 22 to the buffer shelf 22'; etc. By continuing this process, all of the new cassettes in cartridge 302 are disposed as desired upon respective video cassette shelves 22, and the video cassettes to be replaced are ultimately disposed within the cartridge 302. It will be apparent that the process may be altered to some extent such that the first cassette to be transferred to the buffer shelf 22' may be a new cassette removed from cartridge 302. In other words, a first new cassette will be transferred from the cartridge 302 to buffer shelf 22'; a first cassette to be replaced will then be moved to the vacant cassette shelf in cartridge 302; the first new cassette will then be transferred from buffer shelf 22' to the vacant cassette shelf 22; etc.

In the preferred embodiment, all of the components described herein are modular in nature in that each can be readily replaced as a unit in a short period of time and using normal hand tools. To this end, all electrical and control wiring may be terminated in modular connectors, not shown, and access may be provided from the front and the rear of the housing 2. The modular aspects of the apparatus will be enhanced by providing onboard cabinet controllers as described in the foregoing applications which are responsible for motor control and video cassette player command functions.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. An automated cassette library apparatus comprising:

a housing;

a plurality of cassette shelves, each cassette shelf of said plurality of cassette shelves being disposed horizontally within said housing;

a plurality of cassette players, each cassette player of said plurality of cassette players being disposed horizontally within said housing;

a cassette transport unit disposed horizontally within said housing, said cassette transport unit having a cassette carrying cavity therein and including a plate having a longitudinal axis which extends in the direction of a first axis, said plate being movably mounted to said cassette transport unit and disposed in said cassette carrying cavity, first means disposed in said cassette carrying cavity for selectively transferring a cassette in the direction of said first axis from a cassette shelf into said cassette carrying cavity in a first mode and from said cassette carrying cavity into a cassette shelf in a second mode; second means disposed in said cassette carrying cavity for selectively transferring a cassette in the direction of a second axis which is perpendicular to said first axis from said cassette carrying cavity into a cassette player in a third mode and from a cassette player into said cassette carrying cavity in a fourth mode; and third means disposed in said housing (a) for selectively transporting said cassette transport unit in the direction of a third axis, which is perpendicular to said first axis and said second axis, and relative to said plurality of cassette shelves and said plurality of cassette players when said plate is disposed within said cassette carrying cavity; (b) for selectively transporting said cassette transport unit in the direction of said third axis, at the beginning of said first mode when said plate is disposed within said cassette shelf, to move said plate towards and into engagement with a cassette, when selectively transferring a cassette from a cassette shelf to said cassette carrying cavity, and (c) for selectively transporting said cassette transport unit in the direction of said third axis, at the end of said second mode when said plate is disposed within said cassette shelf, to move said plate away from and out of engagement with said cassette when selectively transferring a cassette from said cassette carrying cavity to a cassette shelf;

said second means comprising a guide member which extends in the direction of said second axis and which is disposed in said cassette carrying cavity and attached to said cassette transport unit; a slidable track which is disposed within said cassette carrying cavity and extends in the direction of said first axis and includes means which mates with said guide member for controlling direction of sliding movement of said slidable track from one end of said guide member to an opposite end of said guide member; means movably mounted to said slidable track for abutting said cassette in said third mode and for gripping said cassette in said fourth mode; and means mounted to said cassette transport unit and to said slidable track for sliding said slidable track relative to said guide member in said third mode and said fourth mode and for actuating said abutting and gripping means in said fourth mode; said abutting and gripping means including a first gripping arm movably mounted to said slidable track and disposed relative to said cassette transport unit for engaging one surface of said cassette in said fourth mode and a second gripping arm movably mounted to said slidable track and disposed relative to said cassette transport unit for engaging an opposite surface of said cassette in said fourth mode; said first gripping arm being movably mounted to a first end of said slidable track and said second gripping arm being movably mounted to an opposite second end of said slidable track, said first gripping arm being spring biased towards said second gripping arm by a spring attached between said first gripping arm and said second gripping arm; said sliding and actuating means further including a first pulley attached to an axle, said axle being rotatably mounted to said cassette transport unit, and a second pulley rotatably mounted to said cassette transport unit, said first pulley being spaced from said second pulley along a line which extends in the direction of said first axis, said first pulley and said second pulley being operatively coupled together for rotation in opposite rotational directions; a first crank arm attached to said first pulley and a second crank arm attached to said second pulley; a first abutment member movably mounted to said first end of said slidable track and pivotally coupled to said first crank arm; a second abutment member movably mounted to said second end of said slidable track and pivotally coupled to said second crank arm; and means attached to said cassette transport unit for rotating said first pulley bi-directionally.

2. An automated cassette library apparatus of claim 1 wherein said rotating means comprises:

a bi-directional motor mounted to said cassette transport unit;

a third pulley affixed to said axle and a fourth pulley operatively coupled to said bi-directional motor, said third pulley and said fourth pulley being spaced from each other along a line which extends in the direction of said second axis;

an endless belt operatively coupled between said third pulley and said fourth pulley; and, means electrically connected to said bi-directional motor for activating said bi-directional motor.

3. An automated cassette library apparatus of claim 2 further including first urging means extending from said first gripping arm and engagable by said first abutment member for urging said first gripping arm away from said second gripping arm when said slidable track approaches an end of said guide member nearest said select cassette player and said bi-directional motor is activated in a first direction, and second urging means extending from said second gripping arm and engagable by said second abutment member for urging said second gripping arm away from said first gripping arm when said slidable track approaches said end of said guide member nearest said select cassette player and said bi-directional motor has been activated in said first direction, said first abutment member and said second abutment member being disengaged from said first urging means and said second urging means, respectively, and said first gripping arm and said second gripping arm being urged towards each other by said spring, when said bi-directional motor has been activated in an opposite second direction.

4. An automated cassette library apparatus of claim 3 wherein said first urging means includes a first finger which is integral with said first gripping member and wherein said second urging means includes a second finger which is integral with said second gripping member.

5. An automated cassette library apparatus of claim 4 further including means disposed within said cassette carrying cavity for urging said first gripping arm and said second gripping arm away from each other against the bias of said spring whereby any cassette which has been transferred into said cassette carrying cavity during said fourth mode is disengaged by said first gripping arm and said second gripping arm before said slidable track is moved to an end of said guide member farthest from said select cassette player.

6. An automated cassette library apparatus of claim 5 wherein said first urging means includes a first camming surface which is integral with said first gripping arm and a first cam follower which is attached to said cassette transport unit and extends into said cassette carrying cavity in alignment with said first camming surface, and said second urging means includes a second camming surface which is integral with said second gripping arm and a second cam follower which is attached to said cassette transport unit and extends into said cassette carrying cavity in alignment with said second camming surface, said first cam follower and said second cam follower being positioned within said cassette carrying cavity such that said first gripping arm will disengage one side of said cassette when said first cam follower engages said first camming surface and said second gripping arm will disengage an opposite side of said cassette when said second cam follower arm engages said second camming surface, and such that said first gripping arm and said second gripping arm will be urged towards each other by said spring when said first gripping arm and said second gripping arm have been moved to a position anywhere along said guide member where said first cam follower does not engage said first camming surface and said second cam follower does not engage said second camming surface.

7. An automated cassette library apparatus of claim 2 wherein said bi-directional motor is a servo a second abutment member movably mounted to said second end of said slidable track and pivotally coupled to said second crank arm; and means attached to said cassette transport unit for rotating said ninth pulley bi-directionally.

wherein said bi-directional motor is a servo

8. An automated cassette library apparatus comprising:

a housing;

a plurality of cassette shelves, each cassette shelf of said plurality of cassette shelves being disposed horizontally within said housing;

a plurality of cassette players, each cassette player of said plurality of cassette players being disposed horizontally within said housing;

a cassette transport unit disposed horizontally within said housing, said cassette transport unit having a cassette carrying cavity therein and including a plate having a longitudinal axis which extends in the direction of a first axis, said plate being movably mounted to said cassette transport unit and disposed in said cassette carrying cavity, first means disposed in said cassette carrying cavity for selectively transferring a cassette in the direction of said first axis from a cassette shelf into said cassette carrying cavity in a first mode and from said cassette carrying cavity into a cassette shelf in a second mode, said first means comprising:

a first bi-directional motor mounted upon said cassette transport unit;

a first pulley rotatably mounted to said cassette transport unit and a second pulley operatively coupled to said first bi-directional motor, said first pulley and said second pulley being spaced from each other along a line which extends in the direction of said first axis;

a first endless belt operatively coupled between said first pulley and said second pulley and attached to said plate; and means electrically connected to said first bi-directional motor for activating said first bi-directional motor;

and second means disposed in said cassette carrying cavity for selectively transferring a cassette in the direction of a second axis which is perpendicular to said first axis from said cassette carrying cavity into a cassette player in a third mode and from a cassette player into said cassette carrying cavity in a fourth mode, said second means comprising:

a guide member which extends in the direction of said second axis and which is disposed in said cassette carrying cavity and attached to said cassette transport unit;

a slidable track which is disposed within said cassette carrying cavity and extends in the direction of said first axis and includes means which mates with said guide member for controlling direction of sliding movement of said slidable track from one end of said guide member to an opposite end of said guide member;

means movably mounted to said slidable track for abutting said cassette in said third mode and for gripping said cassette in said fourth mode, said abutting and gripping means includes a first gripping arm movably mounted to said slidable track and disposed relative to said cassette transport unit for engaging one surface of said cassette in said fourth mode and a second gripping arm movably mounted to said slidable track and disposed relative to said cassette transport unit for engaging an opposite surface of said cassette in said fourth mode, said first gripping arm being movably mounted to a first end of said slidable track and said second gripping arm being movably mounted to an opposite second end of said slidable track, said first gripping arm being spring biased towards said second gripping arm by a spring attached between said first gripping arm and said second gripping arm; and means mounted to said cassette transport unit and to said slidable track for sliding said slidable track relative to said guide member in said third mode and said fourth mode and for actuating said-abutting and gripping means in said fourth mode;

third means disposed in said housing (a) for selectively transporting said cassette transport unit in the direction of a third axis, which is perpendicular to said first axis and said second axis, and relative to said plurality of cassette shelves and said plurality of cassette players when said plate is disposed within said cassette carrying cavity; (b) for selectively transporting said cassette transport unit in the direction of said third axis, at the beginning of said first mode when said plate is disposed within said cassette shelf, to move said plate towards and into engagement with a cassette when selectively transferring a cassette from a cassette shelf to said cassette carrying cavity, and (c) for selectively transporting said cassette transport unit in the direction of said third axis, at the end of said second mode when said plate is disposed within said cassette shelf, to move said plate away from and out of engagement with said cassette when selectively transferring a cassette from said cassette carrying cavity to a cassette shelf, said third means includes a mast disposed in said housing, said mast extending in the direction of said third axis, and wherein said apparatus further includes a carriage movably mounted upon said mast and attached to said cassette transport unit for conveying said cassette transport unit relative to said plurality of cassette shelves and said plurality of cassette players in the direction of said third axis; and fourth means disposed in said housing for selectively transporting said cassette transport unit in the direction of said second axis, said fourth means includes means for movably mounting said cassette transport unit to said carriage, and further including means attached to said carriage for moving said cassette transport unit in the direction of said second axis towards or away from a select cassette player, said moving means comprising:
a second bi-directional motor mounted upon said transporting means;
a third pulley rotatably mounted to said transporting means and a fourth pulley operatively coupled to said second bi-directional motor, said third pulley and said fourth pulley being spaced from each other along a line which extends in the direction of said second axis;
a second endless belt operatively coupled between said third pulley and said fourth pulley and attached to said cassette transport unit; and,
means electrically connected to said second bi-directional motor for activating said second bi-directional motor;
said automated cassette library apparatus further including:
a third bi-directional motor mounted upon said mast at one end of said mast;
a fifth pulley attached to one end of an axle which is rotatably mounted to said mast at said one end;
a sixth pulley operatively coupled to said third bi directional motor;
a third endless belt operatively coupled between said fifth pulley and said sixth pulley;
a seventh pulley attached to an opposite end of said axle;
an eighth pulley rotatably mounted to said mast at an opposite end of said mast;
a fourth endless belt operatively coupled between said seventh pulley and said eighth pulley and attached to said carriage; and
means electrically connected to said third bi-directional motor for activating said third bi-directional motor;
said sliding and actuating means further including;
a ninth pulley attached to an axle, said axle being rotatably mounted to said cassette transport unit, and a tenth pulley rotatably mounted to said cassette transport unit, said ninth pulley being spaced from said tenth pulley along a line which extends in the direction of said first axis, said ninth pulley and said tenth pulley being operatively coupled together for rotation in opposite rotational directions;
a first crank arm attached to said ninth pulley and a second crank arm attached to said tenth pulley;
a first abutment member movably mounted to said first end of said slidable track and pivotally coupled to said first crank arm;
a second abutment member movably mounted to said second end of said slidable track and pivotally coupled to said second crank arm; and
means attached to said cassette transport unit for rotating said ninth pulley bi-directionally.

9. An automated cassette library apparatus of claim 8 wherein said rotating means comprises:
a fourth bi-directional motor mounted to said cassette transport unit;
an eleventh pulley affixed to said axle and a twelfth pulley operatively coupled to said fourth bi-directional motor, said eleventh pulley and said twelfth pulley being spaced from each other along a line which extends in the direction of said second axis;
a fifth endless belt operatively coupled between said eleventh pulley and said twelfth pulley; and,
means electrically connected to said fourth bi-directional motor for activating said fourth bi-directional motor.

10. An automated cassette library apparatus of claim 9 further including first urging means extending from said first gripping arm and engagable by said first abutment member for urging said first gripping arm away from said second gripping arm when said slidable track approaches an end of said guide member nearest said select cassette player and said fourth bi-directional motor is activated in a first direction, and second urging means extending from said second gripping arm and engagable by said second abutment member for urging said second gripping arm away from said first gripping arm when said slidable track approaches said end of said guide member nearest said select cassette player and said fourth bi-directional motor has been activated in said first direction, said first abutment member and said second abutment member being disengaged from said first urging means and said second urging means, respectively, and said first gripping arm and said second gripping arm being urged towards each other by said spring, when said fourth bi-directional motor has been activated in an opposite second direction.

11. An automated cassette library apparatus of claim 10 wherein said first urging means includes a first finger which is integral with said first gripping member and wherein said second urging means includes a second finger which is integral with said second gripping member.

12. An automated cassette library apparatus of claim 11 further including means disposed within said cassette carrying cavity for urging said first gripping arm and said second gripping arm away from each other against the bias of said spring whereby any cassette which has been transferred into said cassette carrying cavity during said fourth mode is disengaged by said first gripping arm and said second gripping arm before said slidable track is moved to an end of said guide member farthest from said select cassette player.

13. An automated cassette library apparatus of claim 12 wherein said first urging means includes a first camming surface which is integral with said first gripping arm and a first cam follower which is attached to said cassette transport unit and extends into said cassette carrying cavity in alignment with said first ,ramming surface, and said second urging means includes a second camming surface which is integral with said second gripping arm and a second cam follower which is attached to said cassette transport unit and extends into said cassette carrying cavity in alignment with said second camming surface, said first cam follower and said second cam follower being positioned within said cassette carrying cavity such that said first gripping arm will disengage one side of said cassette when said first cam follower engages said first camming surface and said second gripping arm will disengage an opposite side of said cassette when said second cam follower arm engages said second camming surface, and such that said first gripping arm and said second gripping arm will be urged towards each other by said spring when said first gripping arm and said second gripping arm have been moved to a position anywhere along said guide member where said first cam follower does not engage said first camming surface and said second cam follower does not engage said second camming surface.

* * * * *